Jan. 5, 1932.  W. J. DRUCKER  1,839,744
MECHANICAL DRIVE
Filed Nov. 18, 1929  2 Sheets-Sheet 1
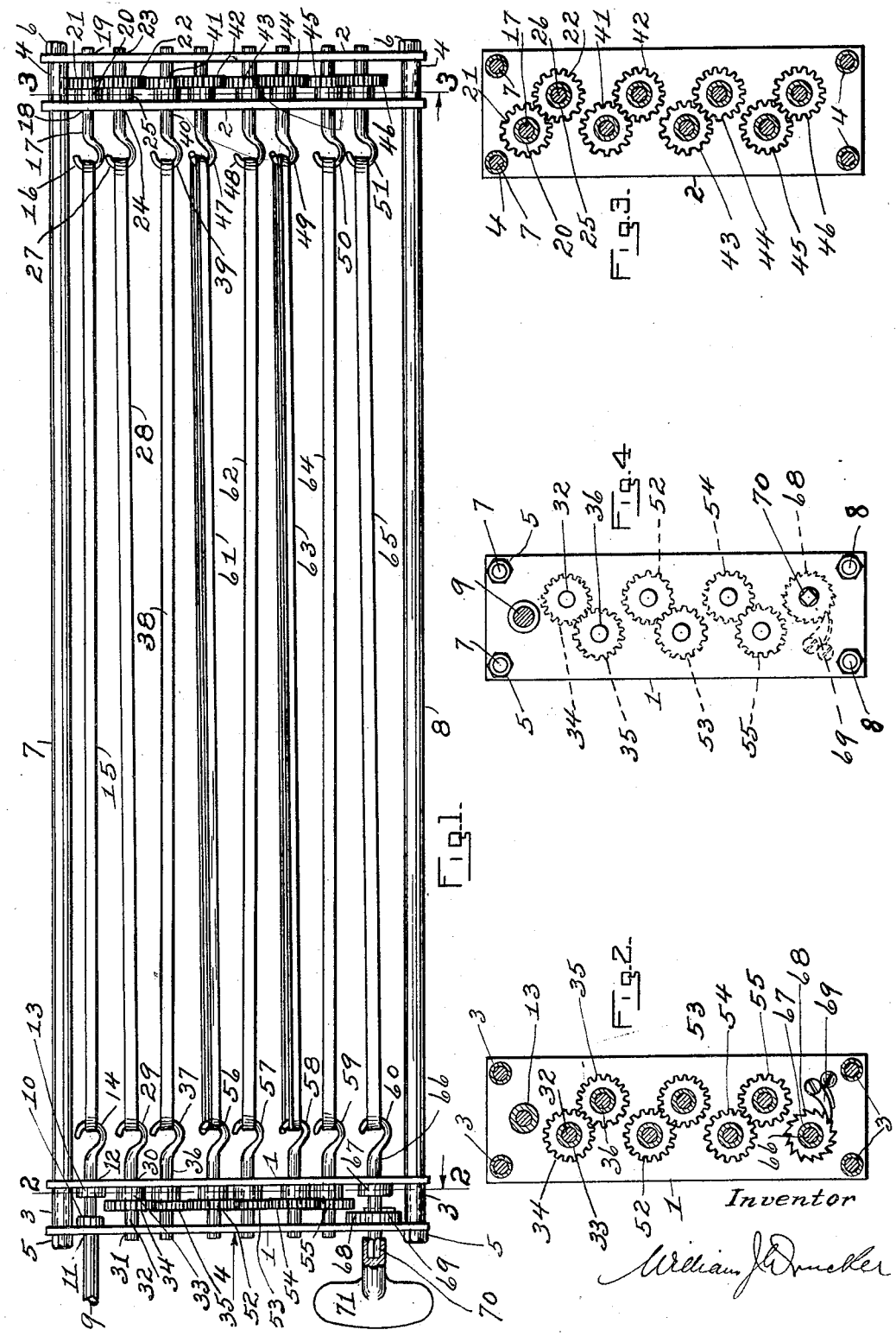
Inventor
William J. Drucker Jan. 5, 1932.  W. J. DRUCKER  1,839,744
MECHANICAL DRIVE
Filed Nov. 18, 1929  2 Sheets-Sheet 2
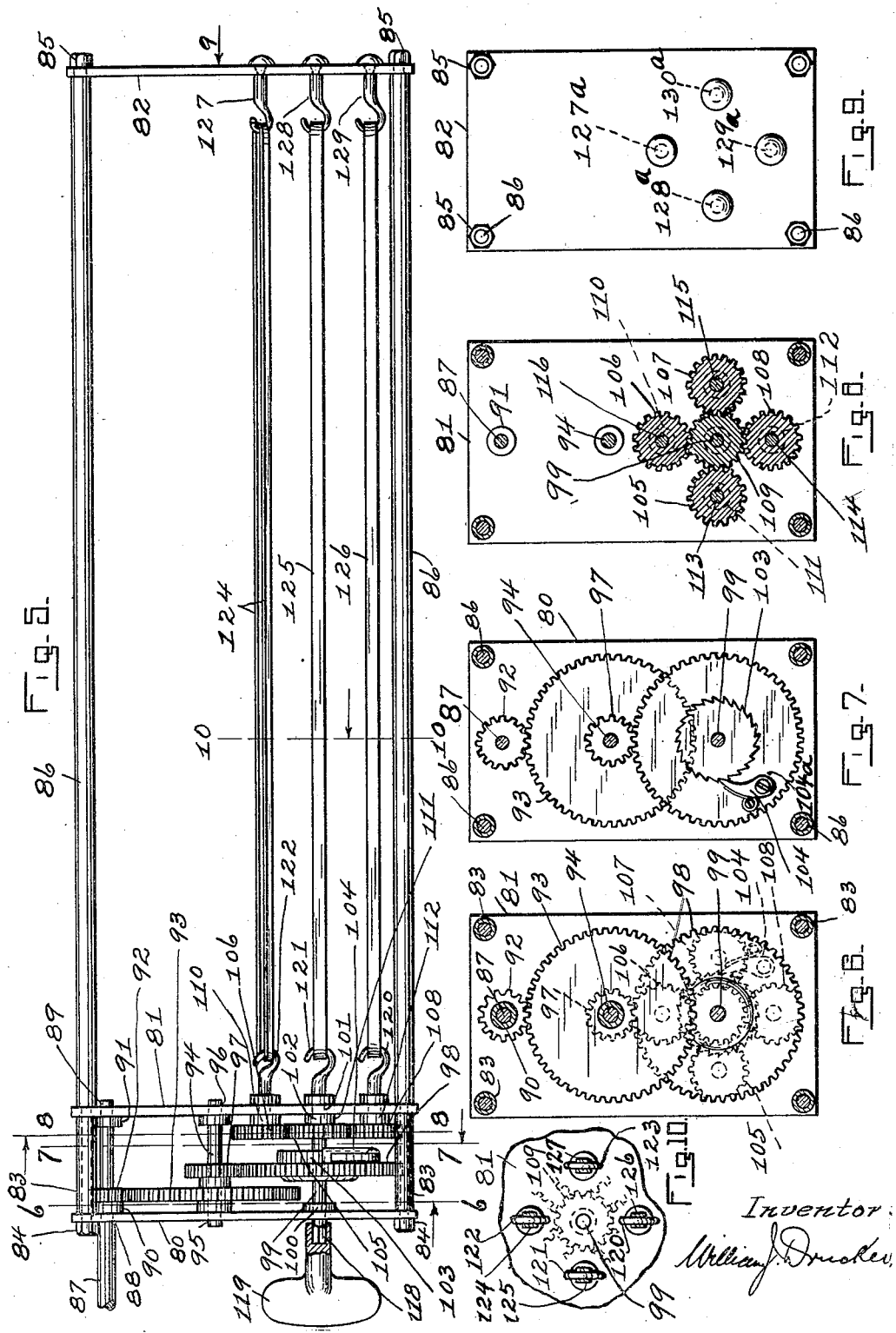
Inventor:
William J. Drucker Patented Jan. 5, 1932

1,839,744

UNITED STATES PATENT OFFICE

WILLIAM J. DRUCKER, OF ALBANY, NEW YORK

MECHANICAL DRIVE

Application filed November 18, 1929. Serial No. 407,959.

The invention relates to a mechanical drive whose torsional power for the drive shaft is derived through the winding of elastic skeins made of rubber strands.

It is applicable and useful in driving air propellers for model airplanes, gliders, toys and other appliances where a large number of revolutions for delivery of revolvable power should be harnessed by mechanical means.

The invention is exemplified in the combination and arrangements of parts shown in the accompanying drawings and described in the following specifications, and is more particularly pointed out in the appended claims.

In the drawings:

Figure 1 is a longitudinal plan view of the device, exhibiting its principal length assembly and parts.

Figure 2 is a transverse section substantially on the line 2—2 in Figure 1.

Figure 3 is a transverse section substantially on the line 3—3 in Figure 1.

Figure 4 is a left end view of the device as seen in Figure 1.

Figure 5 is a longitudinal plan view of a modified form of the device.

Figure 6 is a transverse section on line 6—6 in Figure 5.

Figure 7 is a transverse section on line 7—7 in Figure 5.

Figure 8 is a transverse section on line 8—8 in Figure 5.

Figure 9 is a right hand end view of the device as seen in Figure 5.

Figure 10 is a fragmentary view on line 10—10 in Figure 5.

The ordinary manner of applying rubber strands as a source of torsional power is the usual application of one or two skeins fastened stationary on one end and attached on the other end to a revolvable drive shaft. The longer the skein, the more revolutions can be harnessed in same through the winding of same, for delivery at the drive shaft. Naturally the length of the skein is limited, and it is the object of this invention to adopt a plurality of skeins revolvably mounted, on both their ends, alongside each other, to allow the accumulation of a greater amount of revolutions according to the number of skeins used to be harnessed for delivery at the drive shaft.

In Figures 1, 2, 3 and 4 the frame plates 1 and 2 are mounted on rods 7 and 8. With the aid of spacing tubes 3 and 4 and nuts 5 and 6 the frame is rigidly mounted. The drive shaft 9 revolvable in bearings 11 and 12 is provided with a collar thrust ball bearing 13 and terminates into a hook 14. The skein of rubber strands 15 is secured to hook 14 with one end, to revolvable hook 16 with the other. The shaft 17 is revolvably mounted in bearings 18 and 19, provided with a collar thrust ball bearing 20 and gear 21 rigidly attached. This gear is engaged to gear 22, which is mounted in like manner as gear 20. The shaft of gear 22 terminates in a revolvable hook 27 same as 14 and 16. To this hook 27, is secured another skein of rubber strands 28 with its one end and secured with the other end to a hook arranged on shaft 32, to journal the rigidly mounted gear 34 in like manner as the previously described hook and gear arrangement. Gear 34 is engaged to gear 35 rigidly journaled on shaft 36 terminating in hook 37. To this hook is fastened skein 38 with one end and to hook 39 with the other.

A pair of hooks, shafts, collar thrust ball bearings, and gears are arranged for in like manner as previously described, revolvably connecting the skeins 61, 62, 63, 64. The hook 51 is arranged to receive the last skein 65 leading to hook 60, terminating in shaft 66 journaled in same manner as the previous shafts. A ratchet wheel 68 is rigidly mounted upon shaft 67. A pawl 69 is engaging the ratchet wheel 68 as indicated to check the revolutions of shaft 66 in one direction. Shaft 66 is of a square shape at its end as 70 indicates, to receive a winding key 71 for the purpose of winding this mechanism.

It is understood by this description that a plurality of gear sets and revolvable shafts and hooks connecting a plurality of skeins are mounted in a manner that with winding key 71 subjecting the first skein 65 to winding, the revolutions are partly imparted to skein 64 and successively to the rest of the skeins, 63, 62, 61, 38, 28, 15, by having part of the torsional effect harnessed in the first skein transferred to the following skeins through the arrangement as described.

As any one of the skeins are able to absorb a given amount of revolutions for later delivery—say 200 each as a matter of example—the 8 skeins arranged for in this device could deliver about 8 times 200 or 1600 revolutions on the drive shaft. So the amount of revolutions which can be harnessed in this device increases with the increasing number of skeins provided for. The torsional power is finally checked at the end of skein 15 at hook 14 leading into shaft 9. It is understood that the torsional power at this point can be released by a suitable arrangement according to the construction of apparatus for which this mechanical drive is to serve. Rods 7 and 8 are arranged in this drawing by way of illustration. They might not be needed in instances where it is desirable to mount the left frame with a plurality of gear sets opposite the right frame as in Figure 1, in an apparatus, where the insertion of these two frames might be more advantageously effected without these rods.

It is understood that this mechanical drive, delivering as many revolutions as mentioned with a sufficient torsional effect, depends for its principal means of torsion harnessing and transferring material on rubber or material of similar or better elastic vivacity and stretching resiliency.

The application of gears as a means of transferring revolutions from one skein to the other skeins can also be effected by belt engaged pulleys instead of the teeth engaged gears, and I do not wish to be limited to the gear means solely for this invention. The application of pulleys in place of gears being within the ordinary mechanical skill.

Furthermore, the winding arrangement with key 71 can be enhanced by adding a gear and pinion or other suitable means to increase the ratio of winding revolutions on shaft 66 in winding key 71 according to the best adaptable method for the apparatus, for which this mechanical drive is to serve.

Figures 5, 6, 7, 8, 9 and 10 show a modified form of means to harness a larger number of revolutions by the adoption of a plurality of skeins, to be wound respectively to unwind simultaneously.

To hooks 127, 128, 129 and 130 rigidly secured by rivet heads 127A, 128A, 129A and 130A to plate 82 are connected skeins 124, 125, 126, and 127 at one end, and to hooks 120, 121, 122 and 123 at the other. These hooks are attached to shafts 113, 114, 115 and 116 journaled in plate 81 with the thrust ball bearings as outlined in Figure 1. Four gears, 105, 106, 107 and 108 are rigidly mounted on the four shafts 113, 114, 115, 116, which gears are all secured to gear 109 rigidly mounted on shaft 99 journaled in frame plates 80 and 81. On shaft 99 is furthermore rigidly secured a ratchet wheel 103. A pawl 104 secured as at 104a to gear 98 revolvably mounted upon shaft 99 checks the revolutions of gear 98 in one direction. Gear 98 is engaged to a pinion 97 rigidly mounted on shaft 94 which shaft furthermore accommodates rigidly mounted gear 93 to engage pinion 92 rigidly mounted on the revolvable drive shaft 87 journaled as at 88 and 89.

The procedure for harnessing a large number of revolutions in this device for delivery at the drive shaft 87 is as follows:

Key 119 engages shaft 99 at its square end as at 118. On shaft 99 journaled in frame plates 88, and 81, is mounted gear 98 with pawl 104, ratchet wheel 103 and gear 109 in a manner as before outlined. It is understood that of all the gears applied only gear 98, to which is fastened pawl 68, is not rigidly mounted upon its shaft but revolvable. In winding key 119 pawl 104 rides over the teeth of ratchet wheel 103 leaving gear 98 and thereto engaged pinion 97 as well as gear 93 and pinion 92 towards and including the drive shaft 87 stationary (this phase of function will be enhanced by a suitable checking arrangement on the drive shaft 87 according to best advantage suitable for the device for which this invention is to serve). The rigidly mounted gear 109 revolves simultaneously the four gears 105, 106, 107 and 108 with their shafts and hooks to which are secured the four skeins. The skeins retain the torsional effect imparted to them in winding shaft 99 with key 119 or by other suitable winding means, and this accumulated torsional power in the skeins to be released with the release of shaft 81 for revolvable motions. The four gears 105, 106, 107 and 108 engaging gear 109 and including same being all of the same pitch diameter and having selected gears and pinions, 98, 97 and 93, 92, of a ratio 1 to 4, revolutions can be imparted to the drive shaft 87 to the amount of 3200 if the key 119 respecting the skeins are wound only 200 times. Of course, a plurality of skeins as well as gears and pinions can be applied to vary the amount of revolutions obtainable at the drive shaft in conjunction with the force of power needed.

It will be evident that various mechanical features equivalent to those noted could be employed in accomplishing my several objects, and I do not wish to be taken as representing that the particular parts shown, and particular assembly, are the only ways in which my invention can be accomplished. I have described in full the embodiments of my invention, and will set forth the invention itself in the appended claims.

Having thus described my invention, what I claim as new and desire to secure by Letters Patent is:—

1. In combination a plurality of rubber bands formed into a skein, a plurality of such skeins secured one each with one end to a plurality of stationary hooks and with the other end to revolvable hooks and shafts mounted in a frame, winding means in said frame adapted to simultaneously wind said skeins producing a torsional power, gearing arrangement in said frame adapted for the delivery of said torsional power in increasing revolutions to a revolvable drive shaft.

2. In combination a frame, a drive shaft journaled in said frame, gearing in said frame, winding arrangement in said frame, a plurality of rubber skeins each revolvably secured on one end and stationary on the other, said skeins adapted to impart a number of revolutions as a torsional power upon said gearing secured to said drive shaft.

3. A plurality of elastic, flexible and stretching skeins, stationarily mounted at their one end, revolvably mounted at their other end each by means of a journaling shaft and gear, a plurality of such gears engaged to a common single gear and shaft for the purpose of simultaneously imparting previously harnessed torsional revolutions in said skeins to said common gear and shaft.

WILLIAM J. DRUCKER.